(12) United States Patent
Thompson et al.

(10) Patent No.: US 10,519,887 B1
(45) Date of Patent: Dec. 31, 2019

(54) EXTERNAL MASS AIR FLOW SENSOR FOR DIAGNOSING THE INTERNAL COMBUSTION ENGINE

(71) Applicants: Bernie C. Thompson, Tijeras, NM (US); Neal R. Pederson, Los Alamos, NM (US)

(72) Inventors: Bernie C. Thompson, Tijeras, NM (US); Neal R. Pederson, Los Alamos, NM (US)

(73) Assignee: Automotive Test Solutions, Inc., Albuquerque, NM (US)

( * ) Notice: Subject to any disclaimer, the term of this patent is extended or adjusted under 35 U.S.C. 154(b) by 0 days.

(21) Appl. No.: 16/163,016

(22) Filed: Oct. 17, 2018

Related U.S. Application Data

(60) Provisional application No. 62/578,707, filed on Oct. 30, 2017.

(51) Int. Cl.
*F02D 41/18* (2006.01)
*F02M 35/10* (2006.01)

(52) U.S. Cl.
CPC ..... *F02D 41/187* (2013.01); *F02M 35/10386* (2013.01)

(58) Field of Classification Search
CPC ...... F02D 41/18; F02D 41/182; F02D 41/185; F02D 41/187; F02M 35/10373; F02M 35/10386
See application file for complete search history.

(56) References Cited

U.S. PATENT DOCUMENTS

| | | | | |
|---|---|---|---|---|
| 5,379,627 A | * | 1/1995 | Bates, Jr. | ............ G01F 25/0007 73/1.16 |
| 10,221,794 B1 | * | 3/2019 | Attard | ..................... F02D 41/18 |

* cited by examiner

*Primary Examiner* — Jacob M Amick
(74) *Attorney, Agent, or Firm* — DeWitt M. Morgan

(57) ABSTRACT

The present invention is one in which an off board Mass Air Flow (MAF) sensor is used to diagnose the internal combustion engine. The MAF sensor is connected to the air induction system of the engine. The sensor is then powered from the vehicles battery. The MAF sensor is designed for lower air flow rates produced from the engine such as; crank, idle, and light load. The sensor creates an output voltage that is proportional to the volumetric air flow of each cylinder entering the engine. This MAF voltage output signal is then used to diagnose engine pumping issues.

10 Claims, 8 Drawing Sheets

EXTERNAL MASS AIR FLOW SENSOR FOR DIAGNOSING THE INTERNAL COMBUSTION ENGINE

CLAIM OF PRIORITY

This application is a continuation-in-part of and claims the benefit of provisional application Ser. No. 62/578,707, filed Oct. 30, 2017.

FIELD OF INVENTION

The present invention is one in which an off board Mass Air Flow (MAF) sensor is used to diagnose the internal combustion engine. The MAF sensor is connected to the air induction system of the engine and a measuring instrument. The MAF sensor is then powered from the vehicles battery or power supply. The MAF sensor is designed for lower air flow rates produced from the engine such as; crank, idle, and light load. The sensor creates an output voltage that is proportional to the volumetric air flow of each cylinder entering the engine as the engine is rotated. This MAF voltage output signal is then used to diagnose engine pumping issues.

BACKGROUND OF THE INVENTION

The internal combustion engine has been around for over a hundred years. During this time there have been countless cases where the engines pumping function has been impaired. However diagnosing these air flow problems can be very difficult. There have been multiple ways designed to locate such problems. Early on the basic diagnostics included a vacuum gauge. By watching the vacuum within the engine was one way to diagnose such problems. However it is evident that this method had problems. Perhaps the biggest problem is in the speed that the engine is turning and the slow response produced from the mechanical vacuum gauge. Additionally there is no way in which to sync the vacuum gauge to the problem cylinder or cylinders.

More recent attempts to solve this problem would be shown in U.S. Pat. No. 6,484,589 by Brock. Brock discloses a piezo sensor for tracking fluid changes from a pump. Senx Technology makes Brocks sensor, "the first look sensor". This is a piezo sensor that is used in the automotive industries. This sensor produces an electrical output that is based on a piezo differential sensor. This sensor responses quickly to changes in pressure but does not account for any amount of pressure or volume that is constant, just the changes within the pressure. The greater the pressure change the greater the voltage output form the piezo element. During a pressure change the sensor responses by producing a voltage output, however once the pressure change has occurred, and the pressure is at a constant (stable) pressure the sensors output will stop. The voltage output from this sensor has no scale that is proportional to the applied pressure. Additionally this sensor can produce ringing that is unwanted. This sensor would be used with a graphing multimeter, oscilloscope and can sync to the engine so the cylinder or cylinders in question could be identified.

Another method that can account for the volume and pressure changes within the internal combustion engine is accomplished with a pressure transducer as seen in U.S. Pat. No. 7,899,608 by Thompson. Since the pressure transducer produces an output that is proportional to the applied pressure the pressure can be accurately read. However the pressure transducer has limitations when used in the internal combustion engine. For example, if the engine does not have a throttle plate or the throttle plate is held wide open, and the engine has a slow rotation there is not enough volume change to change the pressure within the induction system of the engine. Therefore the changes produced from the pressure transducer are minimal. If the throttle plate is present and closed during low Revolutions Per Minute (RPM), it provides a restriction within the induction system that the cylinders can pull against. Therefore the volume in the intake manifold is displaced by each cylinder, thus creating larger pressure changes that produce a larger signal from the pressure transducer. In this condition each volume change can be accurately read by the pressure reading produced from the pressure transducer. The pressure transducer would be used with a, multimeter, graphing multimeter, or oscilloscope, and when used with a graphing multimeter, or oscilloscope can sync to the engine so the cylinder or cylinders in question could be identified.

In summarizing both sensors, the piezo and the pressure transducer have problems with producing a good signal when the engine does not have a throttle plate or the throttle plate is held wide open at crank, idle, and light loads. This is due to a low pressure differential within the induction system in these conditions.

What is needed is a way to accurately read the volume changes produced from the internal combustion engine like the pressure transducer accomplishes, while having the rapid changes occur like the differential piezo sensor accomplishes, without having the unwanted ringing. Additionally this needs to be accomplished where there is a throttle plate in the induction system, or where there is not a throttle plate within the induction system. The present invention accomplishes these goals.

SUMMARY OF THE INVENTION

The present invention relates to the testing of the internal combustion engines pumping ability. This is accomplished by using an off board or external MAF sensor that can be installed on any engine. This type of MAF sensor is based from a common anemometer used for wind speed. The preferred present invention is a hot wire type MAF sensor, shown in FIG. 1. This sensor allows the volumetric air flow changes moving into the engine to be accurately tracked when the engine is rotated to produce pumping events. This data will then be used to diagnose engine pumping issues. The volume flowing into the engine is proportional to the voltage output from the sensor. The inner bore diameter for the housing that holds the MAF sensor can be changed and is how this sensor can be tuned. The larger the bore diameter the slower the air velocity and the lower the output voltage produced from the sensor. The smaller the bore diameter the faster the air velocity and the higher the output voltage produced from the sensor. The present invention has a smaller diameter so that during low engine air flow rates such as at crank, idle, and light loads, the sensor has a higher voltage output with a higher degree of accuracy. The preferred bore diameter is 0.700 thousandths of an inch. This smaller bore diameter allows the sensor to be more sensitive in low air flow conditions. Additionally this higher voltage output makes it easier to see the air flow changes on the display screen of the measuring instrument, such as but not limited to, graphing multimeter, or an oscilloscope. This increased voltage output from the MAF sensor will also help when automating a machine to analyze the MAF sensor output signal.

These air flow changes produced from the engine can be used to diagnose the internal combustion engines pumping cycles. This sensor can be used to diagnose problems such as but not limited to; sealing issues with the intake valve, sealing issues with the exhaust valve, sealing issues with the piston rings, sealing issues with the intake manifold, restricted induction system, restricted exhaust system, flat or worn camshafts, problems with valve opening and closing mechanisms (e.g. rocker arms), camshaft timing issues, and carbon build up within the engine.

Many of these problems can be very hard to diagnose. However with the present invention the air volumetric flow rate can indicate what is wrong with the engine. This simplifies the diagnoses of the internal combustion engine. It is also known that some problems occur at higher air flow volume rates. In order to a accommodate these higher air flow volume rates a bypass is built in to the MAF sensor housing as shown in FIG. 2.

DESCRIPTION OF THE PREFERRED EMBODIMENT

Figure 1:
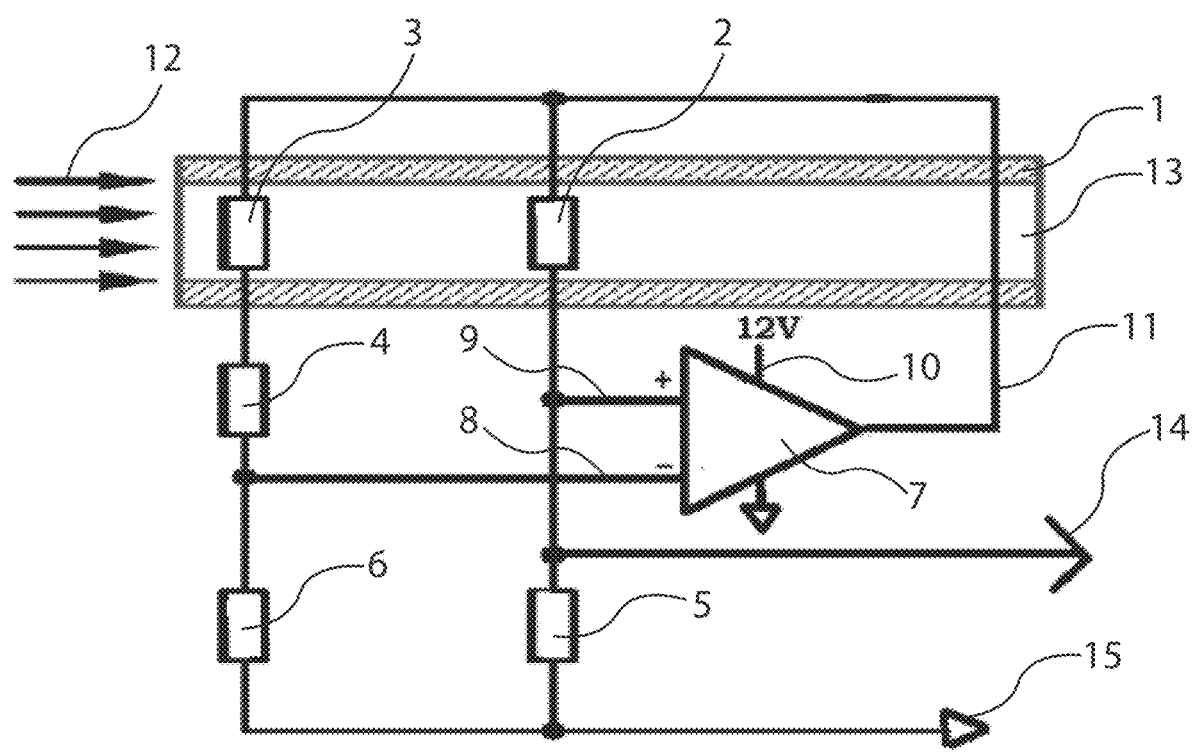
FIG. 1 illustrates the present inventions hot wire MAF sensor.

The present invention is shown in FIG. 1. MAF housing (1) holds the electronics for the hot wire circuit and contains the MAF bore (13). The hot wire (2) is preferred to be made of platinum wire. The air temperature sensor (3) is preferred to be made of platinum foil. This temperature sensor compensates the circuit for the air temperature which changes the air density. Fixed resistor (4) calibrates the air temperature sensor (3). Fixed resistor (5) calibrates the hot wire (2) circuit. Fixed resistor (6) tunes the MAF sensor circuit so that it can be calibrated to match the air flow volume. Operational amplifier (7) monitors air temperature circuit (8) and hot wire circuit (9). The difference between these circuits (8) and (9) sets up output (11) from Operation amplifier (7) which powers air temperature circuit (8) and hot wire circuit (9). Power to circuit (10) is supplied from vehicle battery (not shown). The air flow (12) moves through MAF sensor housing bore (13) by a pressure differential created by the rotating engine. This pressure differential is created by the piston (or piston equivalent e.g. rotor in rotary engine) movement. The air moving through MAF sensor bore (13) removes heat from hot wire (2). This changes the voltage on hot wire circuit (9) which in turn sets up a voltage difference between circuits (8) and (9). Thus the output from operational amplifier is increased allowing more current to flow to hot wire (2). The air flow therefore is proportional to the current flow to hot wire circuit (9) and air temperature circuit (8). Sensor output is read at output lead (14) and is measured against ground (15) which is attached to vehicle ground. The voltage output between these points is proportional to the air flowing through MAF housing bore (13).

The sensor is then put on a flow bench and a known amount of air is moved through MAF sensor bore (13). The voltage output is then matched against known air flow rates to produce a table. This table normalizes the sensors voltage output to that of the air flow rate. The air flow rate from sensor is preferably scaled in that of Grams Per Second (GPS). This transfer function table can be programed into the testing and measuring instrument so that the air flow weight into the engine can easily be measured.

Figure 2:
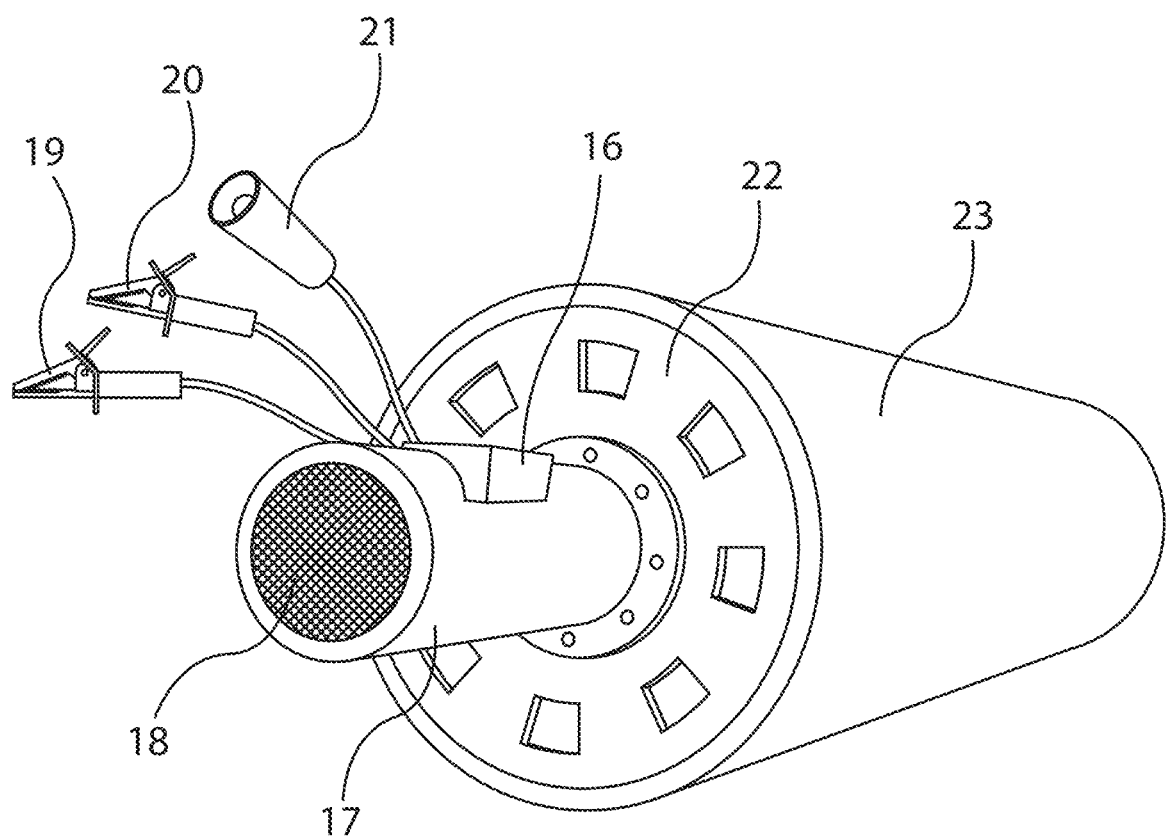
FIG. 2 illustrates the MAF sensor housing with bypass and attaching cone.
Figure 3:
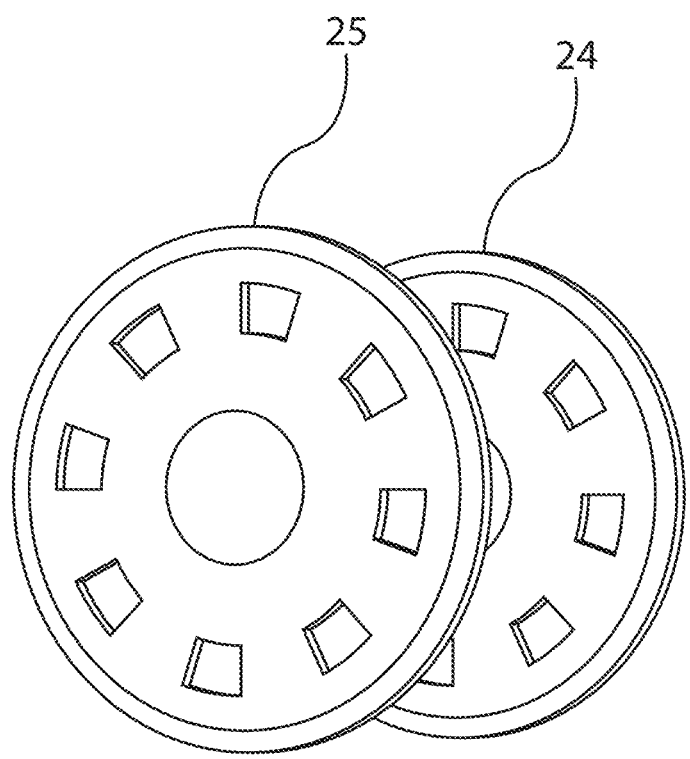
FIG. 3 illustrates the MAF sensors bypass plates.

In FIG. 2 MAF sensor (16) is attached to MAF sensor housing (17). MAF sensor bore housing (17) has screen (18) to straighten the air moving through MAF sensor. Connection leads, (19) connects to vehicle battery or power supply, (20) connects to vehicle ground or power supply and measuring instrument ground, (21) signal output connects to measuring instrument (e.g. multimeter, graphing multimeter, or oscilloscope). MAF sensor housing (17) connects to bypass (22) which is connected to tapered attaching housing (23). Bypass (22) allows air to bypass MAF sensor element in high air flow rate conditions, thus allowing the MAF output reading to accurately read the air flow. This is accomplished by having two discs with holes cut into each disc as shown in FIG. 3. Disc (24) is mounted to housing and is not movable. Disc (25) can turn free from disc (24). This allows the holes in discs (24) and (25) to be aligned thus creating an air bypass, or to be closed allowing no air bypass. This keeps the sensor from going out of limits in high air flow rate conditions. When the bypass is open the sensor is put on a flow bench and a table is produce so the voltage output is normalized for air flow rates. In this way the MAF sensor can accurately measure the air flow rate when the bypass is opened or closed. Due to the sensor being calibrated in the different air flow rates, this information can be used to diagnose MAF sensors, and Manifold Absolute Pressure (MAP) sensors, that are mounted permanently on the vehicle for fuel control of the engine. This is accomplished by monitoring the inventions output, and comparing the gram weight of air flow from the invention, against the gram weight of air produced from the vehicles on board engine control computer. This vehicle data, MAF gram weight of air flow, can be displayed on the scan tool that is connected to the vehicle under test.

Figure 4:
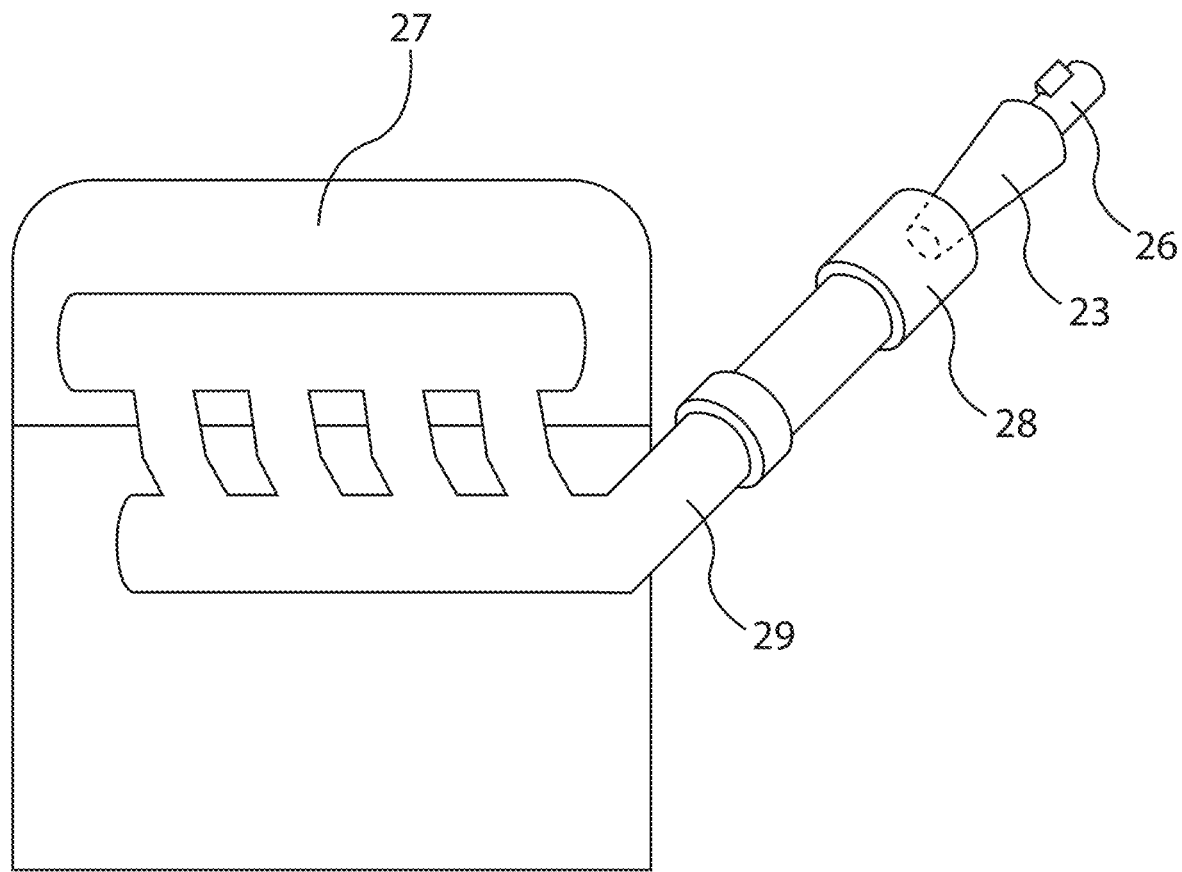
FIG. 4 illustrates the present invention attached to the internal combustion engine with tapered attaching cone.

In FIG. 2 attaching cone (23) is shown. Attaching cone (23) allows the MAF sensor to be attached to many different engines. As shown in FIG. 4 attaching cone (23) is used to attach MAF sensor (26) quickly to engine (27). Attaching cone (23) is put inside intake rubber boot (28) or the like, that is part of Induction system (29). This seals MAF sensor (26) to engine (27) induction system (29). The sensor can now take reading of the air flow rate moving into engine.

Figure 5:
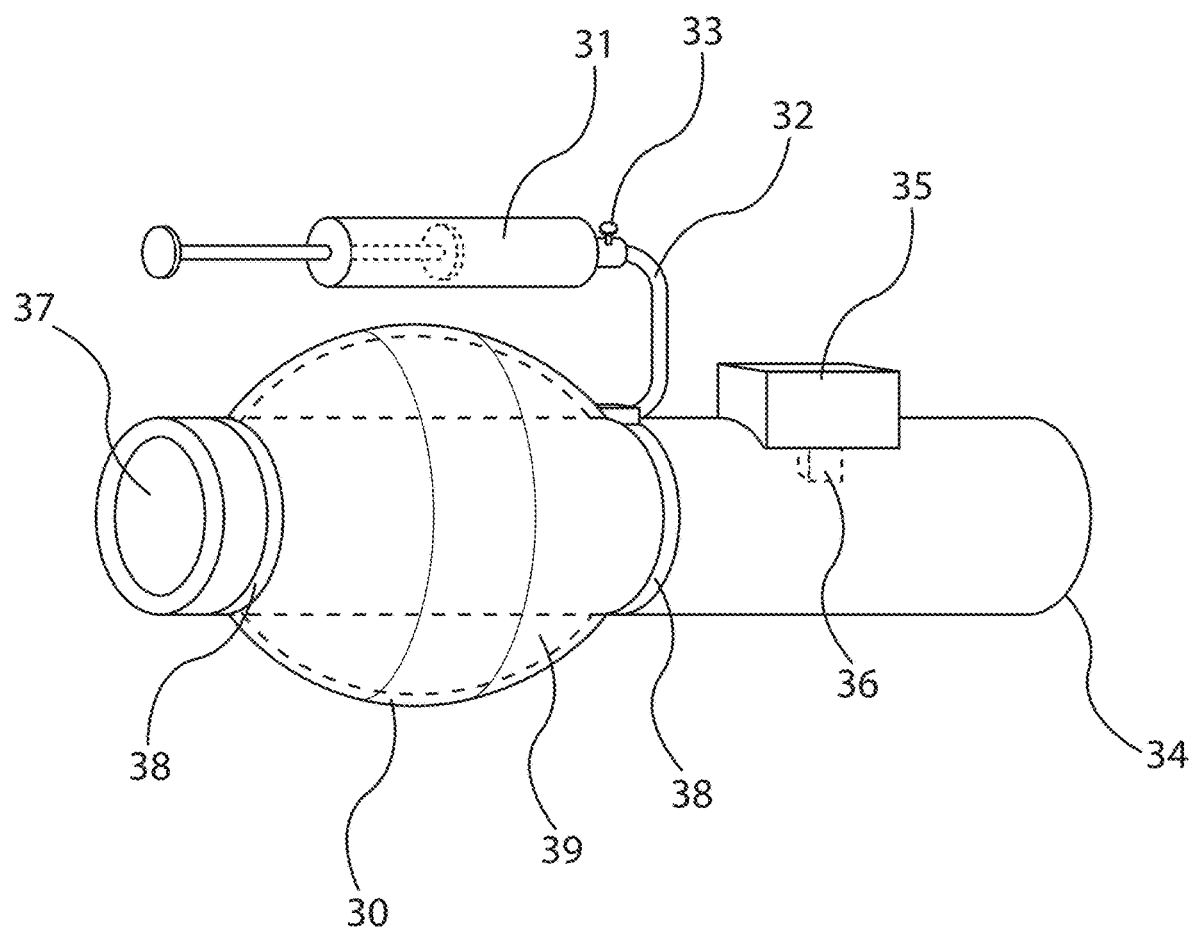
FIG. 5 illustrates the present invention with an air bladder attaching mechanism.

Another way to attach the MAF sensor to the engine is the use of an air bladder as illustrated in FIG. 5. Air bladder (30) is pumped with air by air pump (31) that is in fluid communication to air bladder (30) by hose (32). Air bladder when filled with air will expanded thus sealing the MAF sensor to engines induction system. One way check valve and pressure release (33) is use to trap the air in air bladder (30) and release air from air bladder (30). MAF sensor housing (34) holds air bladder (30) and MAF sensor (35). MAF sensor element (36) protrudes into housing (34) where it monitors air flow moving through bore (37) of housing (34). Banding clamps (38) seal air bladder (30) to housing

Figure 6:
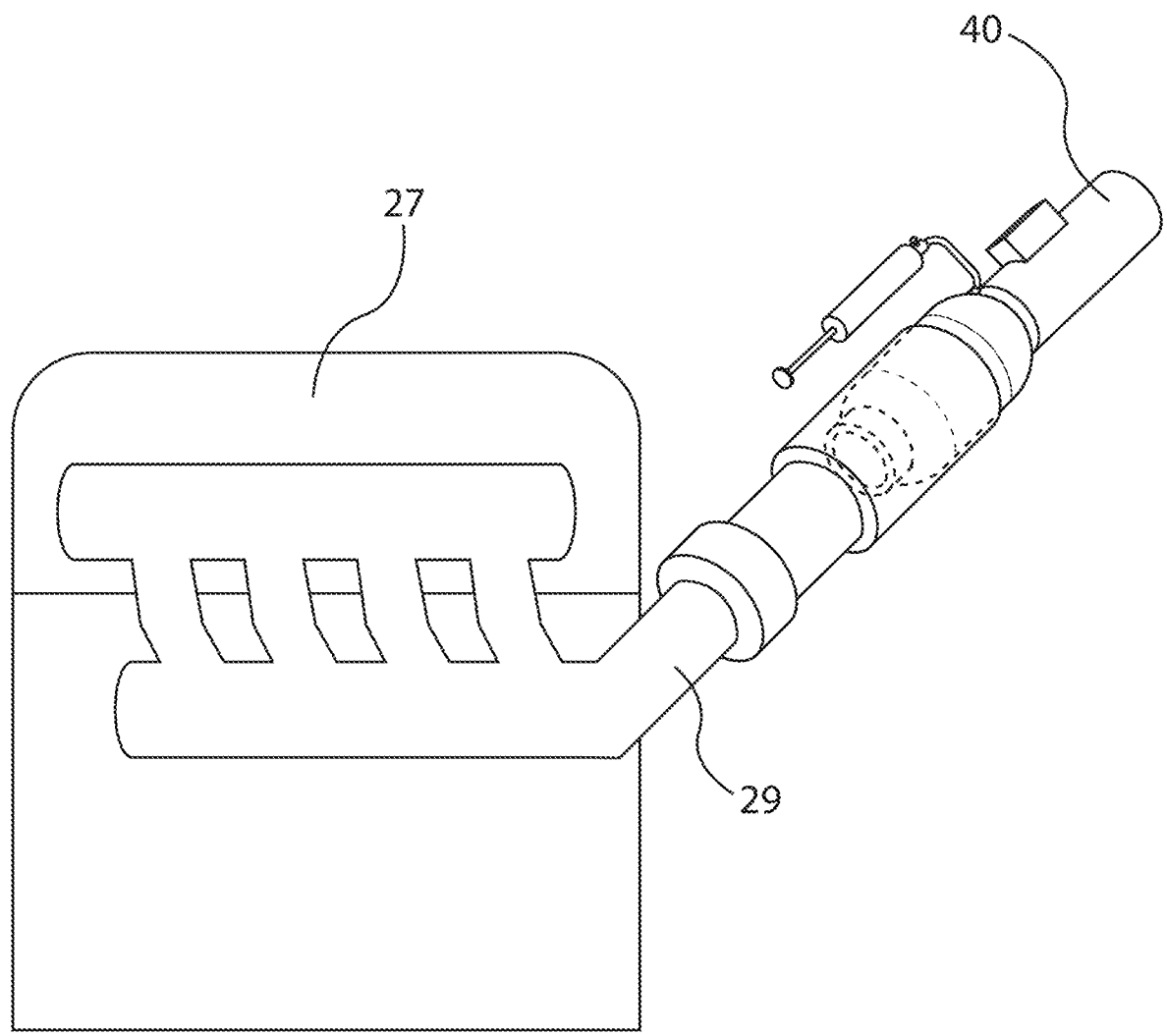
FIG. 6 illustrates the present invention attached to the internal combustion engine with an air bladder attaching mechanism.

(34) so air can fill inner chamber (39) allowing it to expand and seal to engines induction system. FIG. 6 illustrates the Air bladder MAF sensor (40) attached to engine induction system (29) of engine (27).

Figure 7:
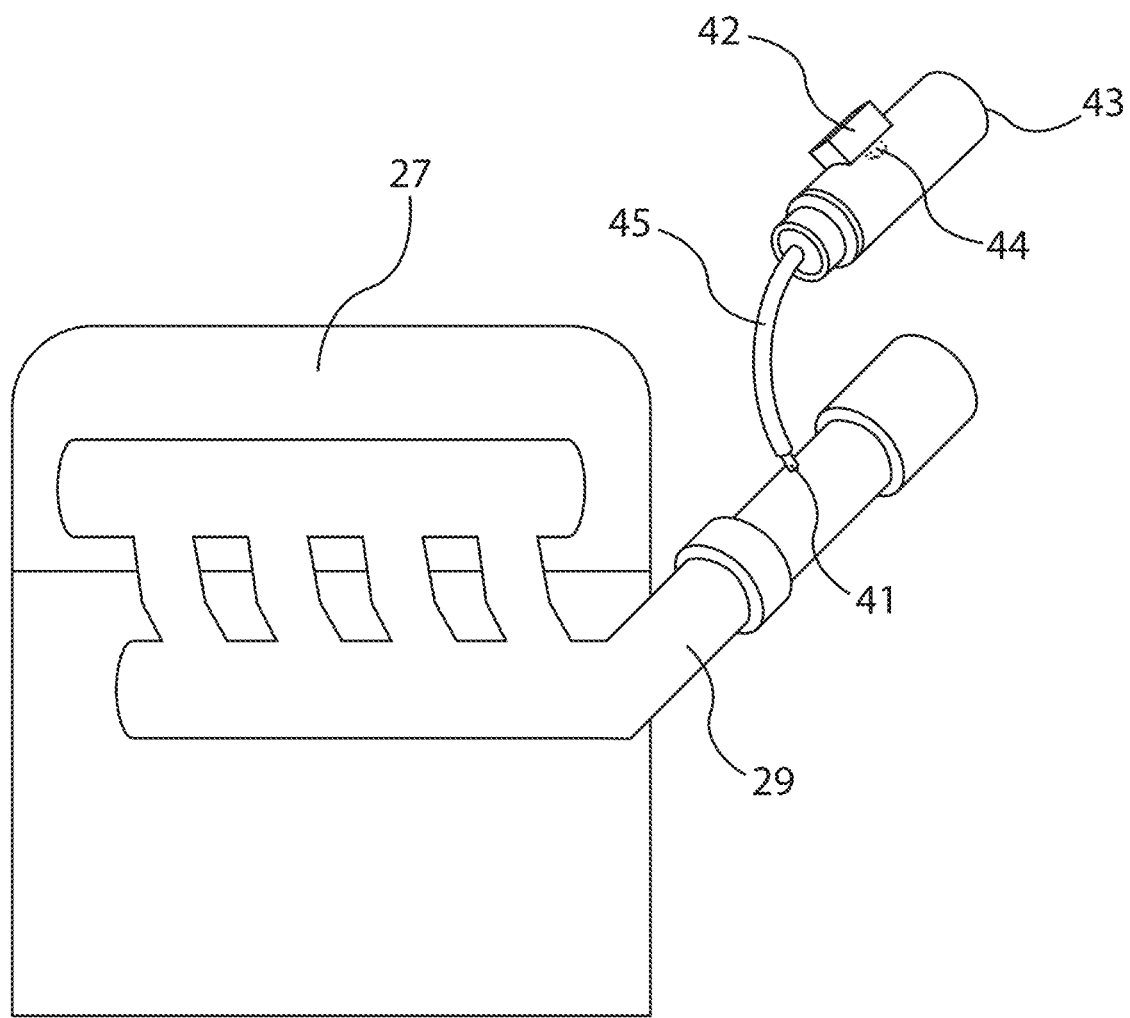
FIG. 7 illustrates the present invention connected to the engine induction port with a hose.

Yet another way to attach the MAF sensor is to connect it to a vacuum port as illustrated in FIG. 7. Engine (27) has induction system (29) with induction port (41). MAF sensor (42) is connected to MAF housing (43) where MAF element (44) protrudes into MAF housing (43) thus allowing it to monitor a portion of the air flowing into engine (27). MAF housing (43) is attached to engine intake manifold (29) by intake port (41). Hose (45) connects MAF sensor housing (43) to engine intake port (41). This method is best used when there is a throttle plate in induction system (not shown).

Figure 8:
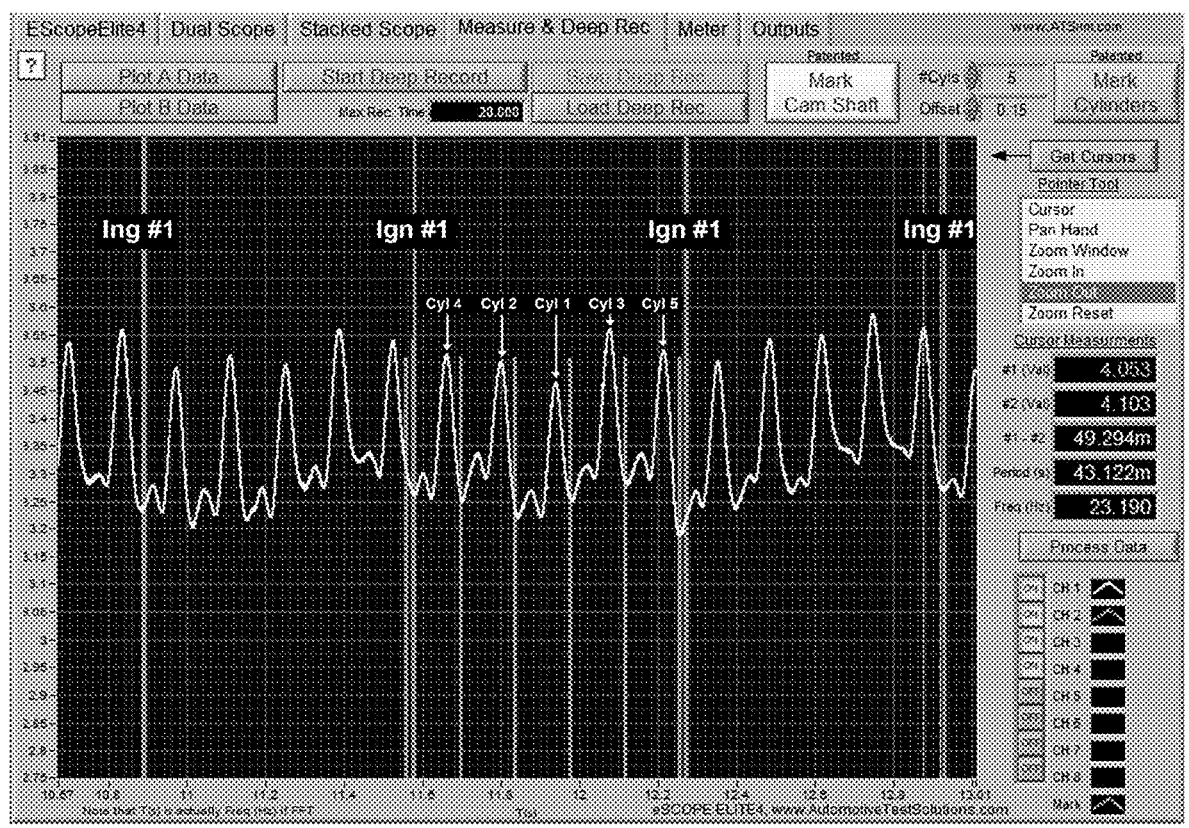
FIG. 8 shows MAF voltage output with ignition event to locate cylinders from engine.

In order to sync the MAF sensor output to the engine to determine which cylinder or cylinders are faulty, a spark event (spark ignition engine) or an fuel injector event (compression ignition engine) will be used. Here after spark event or fuel injector event will be referred to as an ignition event. Once the ignition event has been connected to measuring instrument, e.g. graphing multimeter or oscilloscope, the firing order from the engine will need to be known. The firing order and the MAF sensors volumetric air flow output rate of each cylinder is then used to locate the faulty cylinders or cylinders. FIG. 8 shows MAF voltage output with ignition event from cylinder #1 on a 5 cylinder engine (Firing Order 1-3-5-4-2), with the throttle wide open, to locate individual cylinders from the engine. By using the engine firing order and an ignition event with the MAF output signal, the engines individual cylinders air flow rates can be located.

It will be important to understand that there are many different MAF sensor types that could be used without changing the scope of the invention. Some of these sensor types are, but not limited to; hot wire sensor, hot film sensor, sound sensor, light sensor, and air door sensor. All of these MAF sensors could work for the invention. The hot wire sensor was chosen due to its quick response time.

Whereas the drawings and accompanying description have shown and described the preferred embodiments of the present invention, it should be apparent to those skilled in the art that various changes may be made in the forms and uses of the inventions without affecting the scope thereof.

We claim:

1. A method of monitoring the pumping events of the internal combustion engine with an off board Mass Air Flow sensor, herein after MAF sensor; such sensor is connected to the induction system of an engine and to a measuring instrument; the method including the steps of:

connecting the MAF sensor to the induction system of the engine;
connecting the MAF sensor to the measuring instrument;
connecting a power supply to the MAF sensor;
rotating the engine to produce pumping events;
producing a voltage from the MAF sensor that is proportional to the air volume moving through the MAF sensor into the engine; and
using this data to diagnose engine pumping issues.

2. The method as set forth in claim 1 wherein the MAF sensor is used with an ignition event to locate the individual cylinders volumetric pumping events of the engine.

3. The method as set forth in claim 2 wherein the MAF sensor is used to diagnose the volumetric pumping events of each cylinder of the internal combustion engine.

4. The method as set forth in claim 1 wherein the MAF sensor is connected to the engine induction system with an attaching cone.

5. The method as set forth in claim 1 wherein the MAF sensor is connected to the engine induction system with an air bladder.

6. The method as set forth in claim 1 wherein the MAF sensor is connected to the engine induction system with a hose to an induction port.

7. The method as set forth in claim 1, wherein the MAF sensor has a means to allow air flowing into the engine to bypass the MAF sensors element in high air flow rate conditions.

8. The method as set forth in claim 1, wherein the MAF sensor has a small bore diameter so that the air flow speed is increased at engine low air flow conditions which includes at least one of; engine crank, engine idle, and engine low load.

9. The method as set forth in claim 1, wherein the MAF sensor can be used to diagnose problems which includes at least one of; sealing issues with the intake valve, sealing issues with the exhaust valve, sealing issues with the piston rings, sealing issues with the intake manifold, restricted induction system, restricted exhaust system, flat or worn camshafts, problems with valve opening and closing mechanisms, camshaft timing issues, and carbon build up within the engine.

10. The method as set forth in claim 1, wherein the MAF sensor can be used to diagnose problems with the sensors of a vehicles engine control system which includes at least one of; permanently mounted MAF sensor and permanently mounted Manifold Absolute Pressure sensor.

* * * * *